Patented Dec. 25, 1923.

1,478,943

UNITED STATES PATENT OFFICE.

EDWARD LEONARD DANCE, OF HAMILTON, AUCKLAND, NEW ZEALAND, ASSIGNOR TO THE NEW ZEALAND CO-OPERATIVE DAIRY COMPANY, LIMITED, OF HAMILTON, AUCKLAND, NEW ZEALAND.

MANUFACTURE OF CASEIN GLUE.

No Drawing.  Application filed March 21, 1922.  Serial No. 545,629.

*To all whom it may concern:*

Be it known that EDWARD LEONARD DANCE, citizen of the Dominion of New Zealand, residing at Hamilton, in the Province of Auckland, New Zealand, has invented new and useful Improvements in the Manufacture of Casein Glue, of which the following is a specification.

This invention relates to the manufacture of casein glue which is intended for use both as a glue for wood and several other materials, and also as a base or carrying agent for paints and as a binding agent or cement for other materials such as asbestos, paper pulp, etc.

The existing animal refuse glues, which are in such universal use, have several disadvantages, such as disagreeable smell, long and difficult methods of preparation, and require rapid manipulation at a high temperature to form a perfect joint, whilst casein glues of other kinds have usually the various elements put up and sold in separate containers which is inconvenient for use.

The object of our invention is to overcome these disadvantages, and make up an improved product having a wide range of utility both as a glue, carrying agent for paints, etc., and as a binder for other materials required in many industries. It is also our objective for the convenience of the user, to make up the glue in the form of a powder to be put up in air tight containers, a sufficient quantity for the work to be done being taken from the container, and, where used as a glue, mixed with cold water to the desired consistency. The precise directions for mixing in its various uses would be printed on the container.

According to this invention, we make up the powder with the following constituents:

1. Casein                   72%
2. Pure sodium silicate     27.7%
3. Sodium tungstate         .25%
4. Camphor solution         0.1%

We prepare the camphor solution as follows:

One pound of camphor is digested in ten (10) pounds of spirits of wine. This solution is too concentrated to use as desired in the glue powder, so we dilute it with pure ether in the proportions of one part camphor to five parts of ether. The camphor solution as prepared above is then sprayed over the powdered casein before the addition of the other ingredients. The rapid evaporation of the spirits of wine and ether leaves the pure camphor in a very finely divided state evenly distributed in the powdered casein.

We prepare the powder from these ingredients which are mixed as follows:

To the resultant casein the correct proportion of sodium tungstate to suit the casein analysis is added and mixed: then the sodium silicate is added and the whole rolled and kneaded until the resulting conglomerate becomes friable and will pass approximately a 20 mesh sieve. After making sure no free moisture is present, this powder is then dried and ground to the desired fineness. In order to produce a glue having a high water resisting power, we add to the powder calcium hydrate.

The completed compound is well mixed and kneaded until the necessary chemical changes are complete. At this stage the mixture is placed on trays and exposed to the action of a dry atmosphere. After two or three hours, a definite stage of friability is reached, which allows the mixture to be further ground, when it is again placed in the open air, until the action is complete. At this stage, the mixture is dry and hard, enabling it to be finally ground and then sifted through the desired mesh. The powder thus obtained is again exposed to atmospheric influence for about twenty hours when it is ready for packing in air tight containers.

We find that the resultant powder, through the chemical action of the various ingredients, the purity of same, and the care with which they are prepared, combined with the atmospheric action before packing, produces a glue of abnormal strength both in tensile strength and sheer. When the calcium hydrate is added, it also has high water resisting properties.

As regards the proportitons of ingredients. In a chemical compound of this description, it is difficult to give exact and definite proportions for the quantities to be added together, as these depend entirely on the chemical composition of the casein to be used in the glue manufacture, and the amount of ash content in the glue. As the casein is an organic compound its analysis varies considerably and the casein content may be as low as 75 per cent or as high as 83 per cent, whilst the ash may vary from about 2 to 9 per cent. The exact amounts of sodium silicate and sodium tungstate contents would, therefore, vary considerably according to the above conditions. We have found, however, that with a casein content of 70 per cent the average quantities would be approximately as follows:

|  | Per cent. |
| --- | --- |
| Casein | 70.0 |
| Sodium silicate | 27.7 |
| Camphor (added in solution) | 0.1 |
| Sodium tungstate | 0.25 |
|  | 98.05 |

The addition of approximately 2 per cent of calcium hydrate adds to the quicker tendency to insolubility.

In mixing the glue we recommend that no more water be added than is necessary to bring it to the desired viscosity, the glue giving greatest strength when mixed about seven hours previous to using. The glue is used cold, the joints of the timber or other materials to be glued are prepared in the usual manner, and after rubbing the surplus glue from the joints, sufficient pressure is applied to bring the layers of wood or other material in close contact.

Various articles, such as wood, cardboard, red fibre, etc., require a glue having a colour similar to the articles to be glued. We find that the addition of a pigment fast to lime, and of a suitable colour, combines well with the powder, provision being made for adding the pigment either during the final mixing in manufacture, or same can be added as required when mixing the glue for use.

We also use the powder as a base for paints by the addition of the usual loading material and pigments, being especially useful and applicable where the materials to be painted have too much suction for ordinary paints.

Where the pigments and materials for making the paint are put up in the dry ground state ready for use, the glue powder can be incorporated and mixed dry in the manufacture, otherwise the glue would be added to the paint in the right quantity when mixing.

This method of mixing with other agents as a binding material or carrying agent can be adopted for many other industrial uses, such as cement for the manufacture of asbetsos, cement sheet, lagging and insulating materials, moulded paper pulp, and fibre, linoleum cement, etc., different percentages of the glue powder being added to the other manufacturing materials to give the necessary strength for the different purposes.

We claim:—

1. An improved glue made from casein, pure hydrated calcium oxide, pure sodium silicate, sodium tungstate, and camphor solution, consisting of camphor dissolved in spirits of wine mixed in different quantities according to the casein content and quantity of ash present in the glue.

2. An improved glue made from casein, pure hydrated calcium oxide, pure sodium silicate, sodium tungstate, and camphor solution consisting of spirits of wine and ether, mixed in different quantities according to the casein content and quantity of ash present in the glue, combined with a suitable coloring pigment.

3. An improved glue compound comprising casein, pure sodium silicate, sodium tungstate, a camphor solution consisting of camphor dissolved in spirits of wine, and calcium hydrate.

4. An improved compound comprising casein, pure sodium silicate, sodium tungstate, and a camphor solution consisting of camphor dissolved in spirits of wine.

5. An improved glue compound comprising casein, pure sodium silicate, sodium tungstate, and a camphor solution consisting of camphor dissolved in spirits of wine and ether.

6. The method of making a glue consisting of spraying a liquid solution of camphor consisting of camphor dissolved in spirits of wine over powdered casein, then drying the resultant mixture, adding sodium tungstate thereto, adding sodium silicate, then kneading and rolling the whole mixture, and then drying and grinding the whole mixture to a powder of the desired fineness.

7. The method of making a glue consisting of spraying a liquid solution consisting of camphor dissolved in spirits of wine over powdered casein, then drying the resultant mixture, adding sodium tungstate and sodium silicate thereto, kneading and rolling the whole mixture, then drying and grinding the whole mixture to a powder of the desired fineness, and adding calcium hydrate to the ground powder.

8. The method of making a glue compound consisting of spraying a liquid solution of camphor dissolved in spirits of wine over powdered casein, adding sodium tungstate and sodium silicate thereto, kneading and rolling the whole mixture, then drying and grinding the whole mixture to a powder of the desired fineness, exposing the ground powder to the action of a dry atmosphere until a definite stage of friability is reached, then regrinding the powder and reexposing the powder to the action of the atmosphere for a period of twenty hours.

In testimony whereof, I affix my signature in presence of two witnesses.

EDWARD LEONARD DANCE.

Witnesses:
MARSHALL MAYS,
EDWARD HAYDOCK.